G. A. STANTON.
SPRING SUSPENSION FOR VEHICLES.
APPLICATION FILED SEPT. 3, 1918.

1,312,284.

Patented Aug. 5, 1919.
2 SHEETS—SHEET 1.

G. A. STANTON.
SPRING SUSPENSION FOR VEHICLES.
APPLICATION FILED SEPT. 3, 1918.
1,312,284.
Patented Aug. 5, 1919.
2 SHEETS—SHEET 2.
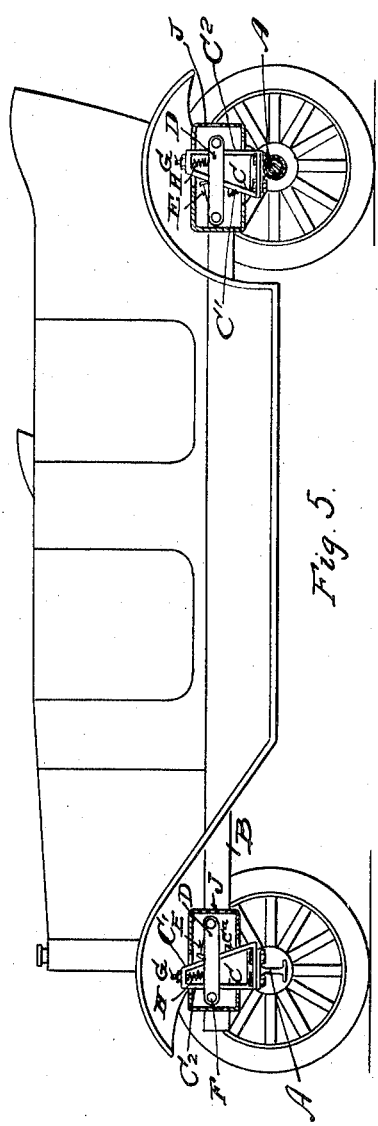
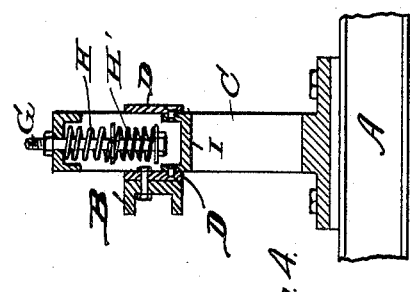
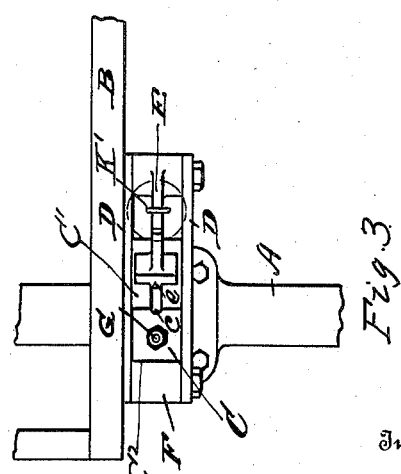
Inventor
Gay A Stanton
By S. E. Thomas
Attorney

UNITED STATES PATENT OFFICE.

GAY A. STANTON, OF BATTLE CREEK, MICHIGAN.

SPRING SUSPENSION FOR VEHICLES.

1,312,284.  Specification of Letters Patent.  Patented Aug. 5, 1919.

Application filed September 3, 1918. Serial No. 252,307.

*To all whom it may concern:*

Be it known that I, GAY A. STANTON, citizen of the United States, residing at Battle Creek, county of Calhoun, State of Michigan, have invented a certain new and useful Improvement in Spring Suspensions for Vehicles, and declare the following to be a full, clear, and exact description of the same, such as will enable others skilled in the art to which it pertains to make and use the same, reference being had to the accompanying drawings, which form a part of this specification.

This invention relates to a spring suspension for vehicles and is designed more particularly for use upon relatively light motor driven or horse drawn vehicles, as shown in the accompanying drawings and particularly described in the following specification and claims.

One object of this invention is to simplify and improve the construction of the spring suspension shown in U. S. Patent No. 1,259,797, issued to me on the 19th day of March, 1918.

One feature of the present invention is the member embodying the "wedge" in which one edge is inclined to receive the free end of a swinging arm pivoted in a supporting frame bolted to the chassis of the vehicle, the opposite edge of the member being vertical to receive an anti-friction roll journaled in the supporting frame at a fixed spaced relation to the journal of the swinging arm, whereby the "wedge" and the free end of the swinging arm may be maintained in operative relation to each other regardless of any forward or backward swaying movement of the vehicle.

Another feature of the invention is the groove formed in the inclined face of the "wedge" to receive a projecting rib on the arc-shaped end of the swinging arm and serving to secure the parts against lateral movement.

Another feature of the invention consists in forming the "wedge" member of a "frame-like" form within which is suspended a spring adapted to receive the thrust of a cross plate or bar bolted to the walls of the supporting frame—in turn secured to the chassis of the vehicle, the purpose of which is to absorb or reduce the oscillation of the vehicle.

Another feature of the invention is the means for limiting the movement of the swinging arm through contact with a stop carried by the "wedge member."

Another feature of the invention consists in providing an inclosing case for the "wedge" and the coöperating swinging member.

With the foregoing and other objects in view which will appear as the description proceeds, the invention resides in the combination and arrangement of parts and in the details of construction hereinafter described and claimed, it being understood that changes may be made in the present embodiment of the invention herein disclosed without departing from the spirit of the same.

In the accompanying drawings:—

Fig. 3 is a fragmentary plan view of the axle and frame of a vehicle showing the device in position upon the axle.

Fig. 4 is a vertical cross-sectional view showing the wedge member secured to a fragment of an axle and the supporting frame of the swinging arm bolted to the chassis of the vehicle.

Fig. 5 is a side elevation of an automobile with parts in section showing the device installed upon the vehicle.

Referring now to the letters of reference placed upon the drawings:—A denotes the axle of a vehicle, B its frame or chassis. C indicates an upright frame-like member bolted to the axle having one of its edges inclined to form a wedge $C^1$, the opposite edge $C^2$ of the frame-like member being vertical. D is a frame surrounding the upright member or wedge C bolted to the chassis B, in which is journaled a swinging arm E. The free end of the swinging arms E is of arc-shaped form and provided with a projecting rib e which extends into a groove c formed in the inclined face C¹ of the member C to insure against lateral movement of the parts.

F denotes an anti-friction roll journaled in the frame D in spaced relation to the journal of the swinging arm E, designed to traverse the vertical edge C² of the member C to maintain the free end of the swinging arm in coöperative relation with the wedge member regardless of any forward or backward swaying movement of the vehicle that may occur.

Supported by a bolt G, from the upper wall of the member C, are springs H, H¹ of varying relative strength to receive the thrust of a cross member I, bolted to the side walls of the frame D, which may result from the vertical oscillation of the vehicle. By providing springs H, H¹ of different tension any degree of vibration may be gradually brought under control.

J, denotes a case suitably supported, adapted to inclose the wedge member and its coöperating parts. K indicates a spring suspended by a hanger K¹ from the swinging arms E, the upper end of which bears against the frame D. K² is a nut engaging the end of the hanger for adjusting the tension of the spring K.

Cª denotes a stop on the member C to limit the movement of the swinging arm E.

Figure 1:
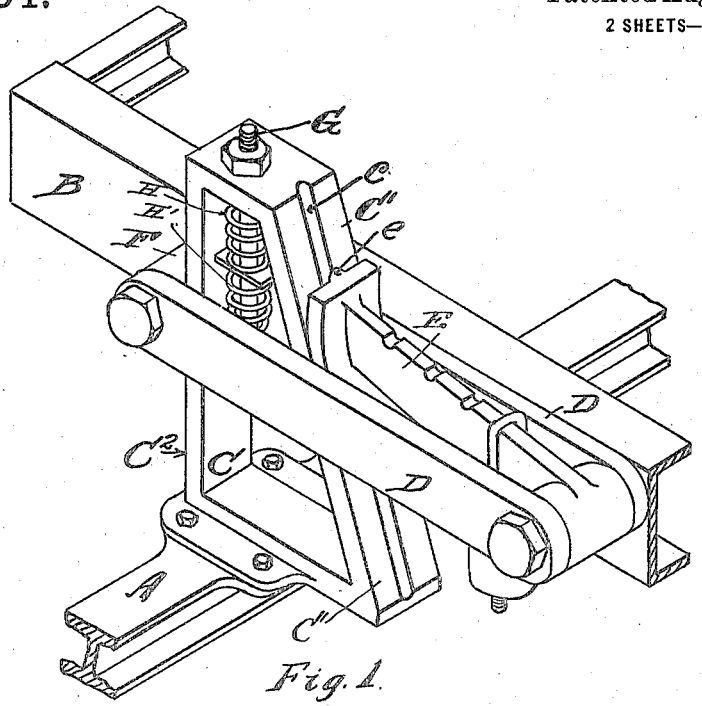
Figure 1 is a fragmentary perspective view indicating a vehicle axle, a member supported thereon comprising a "wedge", a portion of the chassis of a vehicle, and a supporting frame bolted to the chassis, in which a swinging arm is journaled, the free end of the latter bearing upon the inclined edge of the "wedge" member.
Figures 2, 6:
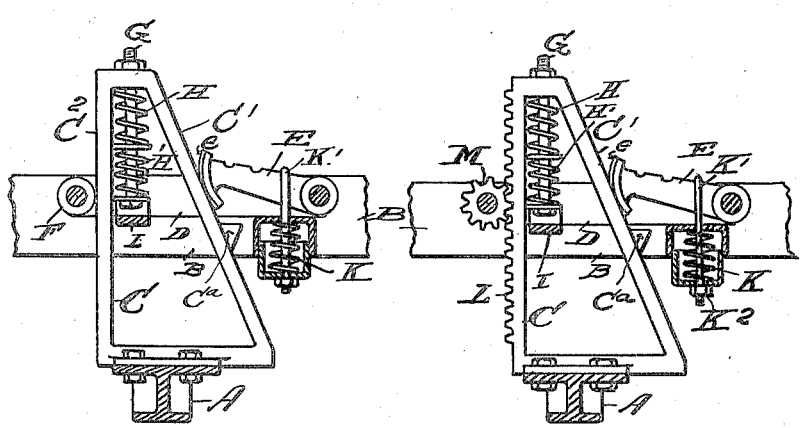
Fig. 2 is a sectional view through the axle of a vehicle, and other parts showing the wedge member and coöperating parts in position.
Fig. 6 is a cross-sectional view through the axle of a vehicle showing a modification of the device mounted thereon with parts in section.

In the modification shown in Fig. 6 the vertical edge of the member C is formed with a rack bar L, traversed by a pinion M, journaled in the frame D. The pinion operating in the rack bar not only serves to maintain the member C and swinging arm E in coöperative relation but also to check the vertical oscillation of the parts.

Having indicated the several parts by reference letters, the construction and operation of the device will be readily understood.

Upon the front and rear axles, on each side of the vehicle are respectively mounted the members C. To the chassis frame directly over the front and rear axles on each side of the vehicle are bolted the members D, in which are journaled the swinging arms E and also the anti-friction rolls F, which bear directly upon the vertical edge of the members C. To meet the requirements of varying load conditions the tension of the springs K may be adjusted by regulating the nut K² on the end of the hanger on which the spring is suspended from the swinging arm;—or the hanger itself may be set in any of the several notches e¹ provided in the swinging arm for its reception.

The frame of the vehicle is thus suspended through the contact of the yieldable swinging arms E with the wedge-shaped edge of the members C, the elements being maintained in coöperative relation by the rolls F, which traverse the vertical edge of the member C:—the degree of vertical oscillation being limited by suitable depending springs suspended by hangers from the swinging arms, and also through a limiting stop mounted on the member embodying the wedge.

Having thus described my invention, what I claim is:—

1. In a device of the character described, a member adapted to be secured to the axle of a vehicle having an inclined edge on one side and a vertical edge on its opposite side, a swinging arm journaled in a supporting frame, its free end bearing upon the inclined edge of said member, a friction roll adapted to traverse the vertical edge of said member journaled in spaced relation to the journal of the swinging arm, and a spring suspended by a hanger from the swinging arm to maintain said swinging arm in coöperative relation with the inclined edge of the first named member.

2. In a device of the character described, a member adapted to be secured to the axle of a vehicle having an inclined edge on one side and a vertical edge on its opposite side, a member bolted to the chassis frame of the vehicle through which said first named member is adapted to project, a swinging arm journaled in said last named member, its free end being adapted to bear upon the inclined edge of the first named member, a friction roll journaled in the member supporting the swinging arm adapted to traverse the vertical edge of the first named member, and a spring suspended from the swinging arm to maintain the free end of the swinging arm in coöperative relation with the inclined edge of said first named member.

3. In a device of the character described, a member adapted to be secured to the axle of a vehicle having an inclined grooved edge on one side and a vertical edge on its opposite side, a swinging arm journaled in a supporting frame bolted to the chassis of a vehicle, the free end of said swinging arm having a projecting rib extending into the groove provided in the inclined edge of the first named member, whereby said parts are held against lateral displacement, a friction roll journaled in spaced relation to the journal of the swinging arm adapted to traverse the vertical edge of the first named member, and a spring suspended from the swinging arm adapted to maintain the latter in contact with the inclined edge of the first named member.

4. In a device of the character described, an upwardly extending member bolted to the axle having an inclined edge on one side and a vertical edge on its opposite side, a frame-like member bolted to the chassis of the vehicle through which the first named member is free to move, a swinging arm journaled in said last named member having an arc-shaped end adapted to bear upon the inclined edge of the first named member, a spring suspended from the swinging arm to maintain the free end of the latter in contact with the inclined edge of the first named member, a spring suspended from said first named member, and a cross-bar bridging the side walls of the frame-like member, adapted to engage the last named spring to limit the oscillation of the vehicle.

5. In a device of the character described, an upright member bolted to the axle having an inclined and also a vertical edge, a swinging arm adapted to bear upon said inclined edge, a supporting frame in which the swinging arm is journaled bolted to the chassis of the vehicle, a roller journaled in the supporting frame adapted to traverse the vertical edge of the upright member, a spring suspended from the swinging arm to maintain the latter in contact with the inclined edge of the upright member, a plurality of springs of varying resiliency suspended from the upright member, and means carried by the supporting member adapted to encounter said last named springs to limit the oscillation of the vehicle.

6. In a device of the character described, an upright member bolted to the axle having an inclined and also a vertical edge, a swinging arm journaled in a suitable supporting frame, adapted to bear upon said edge, a spring suspended from the arm to maintain the latter in contact with the edge, a stop projecting from the inclined edge to limit the movement of the swinging arm, and a roller journaled in spaced relation to the journal of the swinging arm adapted to traverse the vertical edge of the upright member, whereby the parts may be maintained in coöperative relation irrespective of the forward and backward swaying of the vehicle.

In testimony whereof I sign this specification in the presence of two witnesses.

GAY A. STANTON.

Witnesses:
SAMUEL A. HOWES,
ANNA E. RILEY.